United States Patent
Kanai (10) Patent No.: US 11,649,172 B2
(45) Date of Patent: May 16, 2023

(54) LI ION CONDUCTOR AND PROCESS FOR PRODUCING SAME

(71) Applicant: KANEKA CORPORATION, Osaka (JP)

(72) Inventor: Kazuaki Kanai, Osaka (JP)

(73) Assignee: KANEKA CORPORATION, Osaka (JP)

( * ) Notice: Subject to any disclaimer, the term of this patent is extended or adjusted under 35 U.S.C. 154(b) by 0 days.

(21) Appl. No.: 17/886,011

(22) Filed: Aug. 11, 2022

(65) Prior Publication Data

US 2022/0388859 A1    Dec. 8, 2022

Related U.S. Application Data (63) Continuation of application No. PCT/JP2021/008144, filed on Mar. 3, 2021.

(30) Foreign Application Priority Data

Mar. 5, 2020 (JP) .............................. JP2020-038111

(51) Int. Cl.
   *C01F 17/32*      (2020.01)
   *H01M 10/0562*    (2010.01)
   *H01B 1/08*       (2006.01)
   *C01D 15/02*      (2006.01)

(52) U.S. Cl.
   CPC .............. *C01F 17/32* (2020.01); *C01D 15/02* (2013.01); *H01B 1/08* (2013.01); *H01M 10/0562* (2013.01); *C01P 2002/77* (2013.01); *C01P 2006/40* (2013.01); *C01P 2006/80* (2013.01)

(58) Field of Classification Search
   CPC .. H01B 1/00; H01B 1/08; C01F 17/32; C01D 15/02; H01M 10/0562
   See application file for complete search history.

(56) References Cited

U.S. PATENT DOCUMENTS 11,342,581 B2 *    5/2022    Niwa ................ H01M 10/0525

FOREIGN PATENT DOCUMENTS

JP          2016015213 A      1/2016

OTHER PUBLICATIONS

English language machine translation of PCT/ISA/237 (dated Mar. 2020).*
English language machine translation of JP 2016-015123 (pub date Jan. 2016).*

(Continued)

*Primary Examiner* — Mark Kopec
(74) *Attorney, Agent, or Firm* — Osha Bergman Watanabe & Burton LLP (57) ABSTRACT

A Li ion conductor having a composition different from a conventional composition is provided. The Li ion conductor contains at least one selected from a group Q consisting of Ga, V, and Al, Li, La and O. A part of an Li site is optionally substituted with a metal element D, a part of an La site is optionally substituted with a metal element E, and parts of Ga, V and Al sites are optionally substituted with a metal element J. A mole ratio of an amount of Li to a total amount of La, the element E, Ga, V, Al, and the element J is not lower than 8.1/5 and not higher than 9.5/5. A mole ratio of a total amount of Ga, V, and Al to a total amount of La and the element E is not lower than 1.1/3 and not higher than 2/3.

9 Claims, 2 Drawing Sheets

(56) References Cited

OTHER PUBLICATIONS

Duvel et al "Mechanosynthesis of solid electrolytes: Preparation, characterization, and Li ion transport properties of garnet-type Al-doped Li7La3Zr2O12 crystallizing with cubic symmetry", Journal of Physical Chemistry C 2012, 116, 15192-15202.*
Rettenwander et al "A synthesis and crystal chemistry study of the fast ion conductor Li7-3xGaxLa3Zr2O12 with x = 0.08 to 0.85", Inorg. Chem. 2014, 53, 6264-6269.*
Fortal'nova et al "Lithium-ion conducting oxides: Synthesis, structure, and electroconducting properties", Russian Journal of General Chemistry, 2009, vol. 79, No. 9, pp. 1987-1997.*
International Search Report issued in corresponding International Application No. PCT/JP2021/008144 dated May 18, 2021 (6 pages).
Written Opinion issued in corresponding International Application No. PCT/JP2021/008144 dated May 18, 2021 (3 pages).

\* cited by examiner

LI ION CONDUCTOR AND PROCESS FOR PRODUCING SAME

TECHNICAL FIELD

One or more embodiments of the present invention relate to an Li ion conductor and a process for producing the same.

BACKGROUND

Research and development of Li ion secondary batteries have been actively conducted for mobile devices, hybrid automobiles, electric automobiles, and household power storage applications. Li ion secondary batteries used in these fields are required to have high safety, long-term cycle stability, high energy density, and the like.

Among them, all-solid-state batteries in which solid electrolytes are used have been attracting attention because of the high safety of the all-solid-state batteries. For example, Patent Literature 1 discloses $Li_{7+X+Y}La_{3-X}A_XZr_{2-Y}T_YO_{12}$ (where the element A is one or more elements selected from the group consisting of Ba, Sr, Ca, Mg, and Y, the element T is one or more elements selected from the group consisting of Sc, Ti, V, Y, Nb, Hf, Ta, Al, Si, Ga, and Ge, and $0<X\leq1$, $0\leq Y\leq1$, and $X<Y$ are satisfied) as a garnet-type oxide having lithium ion conductivity.

PATENT LITERATURE

Patent literature 1: JP2016-15213A

SUMMARY

One or more embodiments of the present invention provide an Li ion conductor having a composition different from a conventional composition.

One or more embodiments of the present invention are as follows.

[1] An Li ion conductor comprising:
  at least one selected from the group Q consisting of Ga, V, and Al;
  Li;
  La; and
  O, wherein
  a part of an Li site is optionally substituted with a metal element D,
  a part of an La site is optionally substituted with a metal element E,
  parts of Ga, V and Al sites are optionally substituted with a metal element J,
  a mole ratio of an amount of Li to a total amount of La, the element E, Ga, V, Al, and the element J is not lower than 8.1/5 and not higher than 9.5/5, and
  a mole ratio of a total amount of Ga, V, and Al to a total amount of La and the element E is not lower than 1.1/3 and not higher than 2/3.

[2] The Li ion conductor according to [1], wherein
  a lattice constant of the Li ion conductor is not smaller than 12.95 Å.

[3] The Li ion conductor according to [1] or [2], wherein
  the Li ion conductor is represented by formula (1) which is $(Li_{p1}D_{p2})(La_{p3}E_{p4})(Q_{p5}J_{p6})O_{12}$, and
  in the above formula (1),
    Q is at least one element selected from the group consisting of Ga, V, and Al,
    D is a metal element with which a part of the Li site is substituted,
    E is a metal element with which a part of the La site is substituted,
    J is a metal element with which a part of the Q site is substituted,
    p1, p3, and p5 are values larger than 0,
    p2, p4, and p6 are optionally 0,
    p1/(p3+p4+p5+p6) is not lower than 8.1/5 and not higher than 9.5/5,
    p5/(p3+p4) is not lower than 1.1/3 and not higher than 2/3, and
    (a valence of Li)×p1+(a valence of the element D)×p2+(a valence of La)×p3+(a valence of the element E)×p4+(a valence of the element Q)×p5+(a valence of the metal element J)×p6=24 is satisfied.

[4] The Li ion conductor according to [3], wherein
  p1 is not smaller than 8.1 and not larger than 9.5,
  each of p2, p4, and p6 is not smaller than 0 and not larger than 0.5,
  p3 is not smaller than 2.5 and not larger than 3, and
  p5 is not smaller than 1.5 and not larger than 2.

[5] An Li ion conductor represented by formula (2) which is $Li_{x1}La_{x2}(Ga, V, Al)_{x3}Hf_{x4}Sr_{x5}Zr_{x6}O_{12}$, wherein
  in formula (2),
    x1 is not smaller than 8.1 and not larger than 9.5,
    x2 is not smaller than 2.5 and not larger than 3,
    x3 is not smaller than 1.5 and not larger than 2,
    each of x4, x5, and x6 is independently not smaller than 0 and not larger than 0.5,
    x1+x2×3+x3×3+x4×4+x5×2+x6×4=24 is satisfied,
    (Ga, V, Al) means that at least one of Ga, V, and Al is contained, and,
    when a plurality of elements among Ga, V, and Al are contained, x3 means a total amount of the plurality of elements.

[6] A process for producing an Li ion conductor, the process comprising
  sintering a raw material mixture at not lower than 1100° C., wherein
    the raw material mixture contains
      at least one selected from the group Q consisting of Ga, V, and Al,
      Li, and
      La,
    the raw material mixture further contains, as necessary, at least one of
      a metal element D with which a part of an Li site in a crystal structure can be substituted,
      a metal element E with which a part of an La site in the crystal structure can be substituted, and
      a metal element J with which parts of Ga, V and Al sites in the crystal structure can be substituted, and
    in the mixture,
      a mole ratio of an amount of Li to a total amount of La, the element E, Ga, V, Al, and the element J is not lower than 8.1/5 and not higher than 9.5/5, and
      a mole ratio of a total amount of Ga, V, and Al to a total amount of La and the element E is not lower than 1.1/3 and not higher than 2/3.

[7] The process according to [6], wherein
  a mole ratio among the metal elements in the raw material mixture is a stoichiometric ratio in a compound represented by formula (1) which is $(Li_{p1}D_{p2})(La_{p3}E_{p4})(Q_{p5}J_{p6})O_{12}$, and
  in the above formula (1),
    Q is at least one element selected from the group consisting of Ga, V, and Al,
    D is a metal element with which a part of the Li site is substituted, E is a metal element with which a part of the La site is substituted, J is a metal element with which a part of a Q site is substituted, p1, p3, and p5 are values larger than 0, p2, p4, and p6 are optionally 0, p1/(p3+p4+p5+p6) is not lower than 8.1/5 and not higher than 9.5/5, p5/(p3+p4) is not lower than 1.1/3 and not higher than 2/3, and (a valence of Li)×p1+(a valence of the element D)×p2+(a valence of La)×p3+(a valence of the element E)×p4+(a valence of the element Q)×p5+(a valence of the metal element J)×p6=24 is satisfied.

One or more embodiments of the present invention can provide an Li ion conductor having a composition different from a conventional composition.

DETAILED DESCRIPTION

The present inventor has found that favorable Li ion conduction is achieved with a composition described below different from that of a conventionally known Li ion conductor. An Li ion conductor of one or more embodiments of the present invention is an Li ion conductor including: at least one selected from the group Q consisting of Ga, V, and Al; Li; La; and O. A part of an Li site is optionally substituted with a metal element D, a part of an La site is optionally substituted with a metal element E, parts of Ga, V and Al sites are optionally substituted with a metal element J, (i) the mole ratio of the amount of Li to the total amount of La, the element E, Ga, V, Al, and the element J is not lower than 8.1/5 and not higher than 9.5/5, and (ii) the mole ratio of the total amount of Ga, V, and Al to the total amount of La and the element E is not lower than 1.1/3 and not higher than 2/3.

The Li ion conductor of one or more embodiments of the present invention contains, as main constituent elements, Li, La, O and at least one selected from the group Q consisting of Ga, V, and Al. The Li ion conductor is characterized in that: the amount of Li contained in the Li ion conductor is not smaller than a predetermined value (the above condition (i)); and the total amount of Ga, V, and Al contained in the Li ion conductor is larger than the total amount of Ga, V, and Al contained in a conventionally known LLZ-based oxide (an oxide having a basic composition which is $Li_7La_3Zr_2O_{12}$) (the above condition (ii)).

The mole ratio of the amount of Li to the total amount of La, the element E, Ga, V, Al, and the element J is not lower than 8.1/5, and, with this amount, favorable Li ion conduction can be realized. The mole ratio may be not lower than 8.5/5, not lower than 8.7/5, or not lower than 8.9/5. Regarding the upper limit of the mole ratio, the mole ratio is not higher than 9.5/5, and may be not higher than 9.4/5 or not higher than 9.3/5.

The mole ratio of the total amount of Ga, V, and Al to the total amount of La and the element E is not lower than 1.1/3.

The mole ratio may be not lower than 1.3/3, not lower than 1.5/3, and or not lower than 1.7/3.

The metal element D is an element with which a part of the Li site can be substituted. Examples of the metal element D include Al, Sr, Ca, Ba, Mg, Hf, and the like, and Hf is preferable. The metal element E is an element with which a part of the La site can be substituted. Examples of the metal element E include Zn, Ca, Mg, Ba, Sr, and the like, and Sr is preferable. The metal element J is an element with which a part of the Ga, V, or Al site can be substituted. Examples of the metal element J include Te, Ta, Nb, Zr, and the like, and Zr is preferable. The metal elements D, E, and J can be expected to exhibit at least one of: an effect of increasing a bulk ion conductivity (that is, an ion conductivity in a crystal) by optimizing an Li carrier concentration through substitution of each of the sites of the other elements in a crystal structure of the Li ion conductor; and an effect of forming a dense sintered product by obtaining a favorable bonding state of particle interfaces through improvement of sinterability. In particular, at least two of Hf (metal element D), Sr (metal element E), and Zr (metal element J) may be contained. When at least two of them are contained, the Li carrier concentration is optimized so that the bulk ion conductivity is improved. Further, sintering is promoted, and a dense sintered product can be obtained. Thus, the ion conductivity of the entirety obtained by combining bulks and grain boundaries, is improved. In particular, the Li ion conductor may contain Zr (metal element J) and at least one of Hf (metal element D) and Sr (metal element E). This composition is advantageous in improving the ion conductivity of the entirety. It is also preferable that the Li ion conductor contains Sr (metal element E) and at least one of Hf (metal element D) and Zr (metal element J). The Li ion conductor of one or more embodiments of the present invention may contain all of Sr, Hf, and Zr. When all of them are contained, the ion conductivity can be further improved.

Each of the above sites of the elements may be substituted with a corresponding one of Al, Sr, Ca, Ba, Mg, Hf, Zn, Te, Ta, Nb, and Zr which are preferable examples of the above elements D, E, and J. However, sites other than the above sites may be substituted with Al, Sr, Ca, Ba, Mg, Hf, Zn, Te, Ta, Nb, and Zr as long as the Li ion conductor contains these elements along with Li, La, O and at least one selected from the group Q consisting of Ga, V, and Al.

Each element contained in the Li ion conductor of one or more embodiments of the present invention may be contained in a mole ratio that allows the Li ion conductor to be kept electrically neutral. Among the elements in the group Q, at least Ga may be contained, and Ga may be the only element in the group Q.

The Li ion conductor of one or more embodiments of the present invention ordinarily has crystallinity. Examples of the crystal structure of a main phase of the Li ion conductor include a garnet structure, a perovskite structure, and the like. The main phase may be a garnet structure. The main phase refers to a structure to which a peak with the highest intensity in an X-ray diffraction spectrum is attributed. When the Li ion conductor of one or more embodiments of the present invention has crystallinity, the lattice constant of the Li ion conductor may be not smaller than 12.95 Å. When the lattice constant is large, the Li ion conductivity tends to take a favorable value. The lattice constant may be not smaller than 12.97 Å or not smaller than 13.00 Å. Meanwhile, the lattice constant may be not larger than 13.12 Å.

The Li ion conductor of the present disclosure may be represented by the following formula (1).

$$(Li_{p1}D_{p2})(La_{p3}E_{p4})(Q_{p5}J_{p6})O_{12} \quad \text{Formula (1):}$$

In the above formula (1), Q is at least one element selected from the group consisting of Ga, V, and Al, and D, E, and J are respectively identical to the above metal elements D, E, and J. p1, p3, and p5 are values larger than 0, p2, p4, and p6 are optionally 0 (at least one of p2, p4, and p6 is optionally 0), p1/(p3+p4+p5+p6) is not lower than 8.1/5 and not higher than 9.5/5, p5/(p3+p4) is not lower than 1.1/3 and not higher than 2/3, and (the valence of Li)×p1+(the valence of the element D)×p2+(the valence of La)×p3+(the valence of the element E)×p4+(the valence of the element Q)×p5+(the valence of the metal element J)×p6=24 is satisfied.

For D, E, and J in the formula (1), the above descriptions about the metal elements D, E, and J including the preferable ranges therefor can be referred to. For the element Q as well, all the above descriptions about the group Q can be referred to.

The value of p1/(p3+p4+p5+p6) corresponds to the above mole ratio of the amount of Li to the total amount of La, the element E, Ga, V, Al, and the element J, and the value of p5/(p3+p4) corresponds to the above mole ratio of the total amount of Ga, V, and Al to the total amount of La and the element E. Thus, for preferable ranges for these values, all the above ranges for the mole ratios can be referred to.

The values of p1 to p6 are not limited as long as the above relational formula is satisfied. Preferable values thereof are as follows.

p1 may be not smaller than 8.1, not smaller than 8.5, or not smaller than 8.7. Meanwhile, p1 may be not larger than 9.5, not larger than 9.4, or not larger than 9.3.

p2 is not smaller than 0, preferably not smaller than 0.01, more preferably not smaller than 0.05, and further preferably not smaller than 0.075. Meanwhile, p2 may be not larger than 0.5, not larger than 0.2, or not larger than 0.1.

p3 may be not smaller than 2.5, not smaller than 2.7, or not smaller than 2.8. Meanwhile, p3 may be not larger than 3, not larger than 2.95, or not larger than 2.9.

p4 is not smaller than 0, preferably not smaller than 0.05, and more preferably not smaller than 0.1. Meanwhile, p4 may be not larger than 0.5, not larger than 0.3, or not larger than 0.2.

p5 may be not smaller than 1.5 or not smaller than 1.7. Meanwhile, p5 may be not larger than 2 or not larger than 1.9.

p6 is not smaller than 0, preferably not smaller than 0.05, and more preferably not smaller than 0.1. Meanwhile, p6 may be not larger than 0.5 or not larger than 0.3.

Particularly preferable ranges are as follows. p1 is not smaller than 8.1 and not larger than 9.5, each of p2, p4, and p6 is not smaller than 0 and not larger than 0.5, p3 is not smaller than 2.5 and not larger than 3, and p5 is not smaller than 1.5 and not larger than 2.

The Li ion conductor of one or more embodiments of the present invention contains, as necessary, at least one of Hf, Sr, and Zr among Al, Sr, Ca, Ba, Mg, Hf, Zn, Te, Ta, Nb, and Zr described above, in addition to Li, La, O, and at least one selected from the group Q consisting of Ga, V, and Al. It is also preferable that the Li ion conductor has a specific composition. More specifically, one or more embodiments of the present invention further encompasses an Li ion conductor represented by formula (2) which is $Li_{x1}La_{x2}(Ga, V, Al)_{x3}Hf_{x4}Sr_{x5}Zr_{x6}O_{12}$.

In formula (2), x1 is not smaller than 8.1 and not larger than 9.5, x2 is not smaller than 2.5 and not larger than 3, x3 is not smaller than 1.5 and not larger than 2, each of x4, x5, and x6 is independently not smaller than 0 and not larger than 0.5, x1+x2×3+x3×3+x4×4+x5×2+x6×4=24 is satisfied, (Ga, V, Al) means that at least one of Ga, V, and Al is contained, and, when a plurality of elements among Ga, V, and Al are contained, x3 means the total amount of the plurality of elements. In formula (2), when at least any element among Hf, Sr, and Zr is contained, the form in which the element exists is not particularly limited, and, with the element, a part of a site of a corresponding element among Li, La, Ga, V, and Al may be substituted. In formula (2), it is also preferable that x1/(x2+x5+x3+x6) is not lower than 8.1/5 and not higher than 9.5/5, and x3/(x2+x5) is not lower than 1.1/3 and not higher than 2/3 (requirement 2-1).

In addition, in formula (2), it is also preferable that x1 is 8.5 to 9, x2 is 2.9 to 3, x3 is 1.9 to 2, x4 is 0 to 0.1, x5 is 0 to 0.1, and x6 is 0 to 0.1 (requirement 2-2). Further, it is also preferable that formula (2) is $Li_{x1}La_{x2}Ga_{x3}Hf_{x4}Sr_{x5}Zr_{x6}O_{12}$ (requirement 2-3). Formula (2) may satisfy the requirements (2-1) and (2-2), or all of the requirements (2-1) to (2-3).

When a plurality of (k) elements are contained as elements D, the valence of each of the plurality of elements D is defined as $D_i$, and the mole ratio of each element D to all the elements D is defined as $n_i$, the valence of the elements D is calculated according to the following formula. When a plurality of elements are contained as elements E and elements J, the valence of the elements E and the valence of the elements J also only have to be calculated in the same manner.

$$\text{Valence of elements } D = \sum_{i=1}^{k} D_i \times n_i \quad \text{[Formula 1]}$$

An ion conductivity $\sigma_{total}$ at room temperature of the Li ion conductor of one or more embodiments of the present invention measured by a method described later in EXAMPLES is, for example, not lower than $1.0 \times 10^{-6}$ S/cm, preferably not lower than $1.0 \times 10^{-6}$ S/cm, more preferably not lower than $1.0 \times 10^{-4}$ S/cm, and further preferably not lower than $2.0 \times 10^{-4}$ S/cm. The upper limit of the ion conductivity $\sigma_{total}$ is not limited, and the ion conductivity $\sigma_{total}$ may be not higher than $7.0 \times 10^{-4}$ S/cm or not higher than $6.0 \times 10^{-4}$ S/cm. An activation energy $E_a$ (eV) of the Li ion conductor measured by a method described later in EXAMPLES is, for example, not higher than 0.45 eV, preferably not higher than 0.40 eV, and more preferably not higher than 0.37 eV. The lower limit of the activation energy $E_a$ (eV) is not particularly limited, and the activation energy $E_a$ (eV) is, for example, not lower than 0.20 eV.

The Li ion conductor of one or more embodiments of the present invention is obtained by sintering a raw material mixture at not lower than 1100° C. The raw material mixture contains: at least one selected from among the group consisting of Ga, V, and Al; Li; and La. The raw material mixture further contains, as necessary, at least of one of: the metal element D with which a part of the Li site in the crystal structure can be substituted; the metal element E with which a part of the La site in the crystal structure can be substituted; and the metal element J with which parts of the Ga, V and Al sites in the crystal structure can be substituted.

In the raw material mixture, the mole ratio of the amount of Li to the total amount of La, the element E, Ga, V, Al, and the element J, and the mole ratio of the total amount of Ga, V, and Al to the total amount of La and the element E, are equal to the corresponding mole ratios in the above Li ion conductor of the present invention. In a preferable mode, the mole ratio among the metal elements in the raw material mixture is a stoichiometric ratio in a compound represented by the above formula (1), and thus, for this mole ratio, all the descriptions regarding the above formula (1) described as a preferable mode of the Li ion conductor of one or more embodiments of the present invention can be referred to.

As a raw material for each of the metal elements (other than 0) forming the Li ion conductor of the present invention, powders of oxides, carbonates, hydroxides, chlorides, alkoxides, or the like of the said element (i.e., Li, La, Ga, V, Al, the element D, the element E, or the element J), can be used. The Li source powder may be powder of Li oxide or Li carbonate, and the La source powder may be powder of La oxide or La hydroxide. Regarding each of Ga, V, Al, the element D, the element E, and the element J, an oxide, a carbonate, or a hydroxide thereof is preferable (an oxide or a carbonate thereof is particularly preferable). The raw material of each of the metals may be powder of an oxide of the said metal.

The BET specific surface areas of the raw material powders of the respective elements may be adjusted. For example, the BET specific surface area of the La source powder (in particular, $La_2O_3$) may be set to 5 to 15 $m^2/g$, the BET specific surface area of the Li source powder (in particular, $Li_2O$) may be set to 5 to 10 $m^2/g$, the BET specific surface area of the Ga source powder (in particular, $Ga_2O_3$) may be set to 5 to 15 $m^2/g$, and the BET specific surface area of the Zr source powder (in particular, $ZrO_2$) may be set to 15 to 20 $m^2/g$.

The sintering of the raw material mixture performed at not lower than 1100° C. may include: first sintering performed at not lower than 1100° C. in an air atmosphere; and second sintering performed, after the first sintering, at not lower than 1100° C. in an inert gas atmosphere.

In the first sintering, after the raw material mixture is molded under a pressure of, for example, 150 to 400 MPa (preferably 188 to 375 MPa), the obtained molded product (first molded product) may be sintered at not lower than 1100° C. for 8 to 15 hours. This sintering may be performed in an air atmosphere.

In the second sintering subsequent to the first sintering, sintering may be performed for 3 to 30 hours (preferably 5 to 25 hours) at not lower than 1100° C. (preferably not lower than 1200° C.) in an atmosphere of an inert gas such as dry nitrogen gas or argon gas.

When sintering is performed after the raw material mixture is processed into a molded product in the first sintering, the first molded product having been subjected to the first sintering may be pulverized before being subjected to the second sintering. Powder obtained by the pulverization may be molded again under a pressure of about 150 to 400 MPa (preferably 188 to 375 MPa) to obtain a second molded product which is then subjected to the second sintering.

A temperature in the first sintering may be not higher than 1200° C. A temperature in the second sintering may be not higher than 1300° C. The temperature in the second sintering may be higher than the temperature in the first sintering.

Weighing of the raw material mixture and molding in the first sintering may be performed in an environment with a reduced amount of water and are each may be performed in an environment in which the dew point value is −120° C. to −40° C. (preferably −100° C. to −50° C.) (e.g., in a glove box or a dry room). In addition, pulverization in the preferable mode for the second sintering may be also performed in an environment with a reduced amount of water which is the same as the above environment. Further, the second sintering may be also performed in an environment with a reduced amount of water, a dry inert gas such as dry nitrogen with a dew point value of −80° C. to −40° C. can be used, and the flow rate of the inert gas may be set to, for example, 1 to 5 L/min.

The present application claims the benefit of the priority based on Japanese patent application No. 2020-038111 filed on Mar. 5, 2020. All the contents described in Japanese patent application No. 2020-038111 filed on Mar. 5, 2020 are incorporated herein by reference.

EXAMPLES

One or more embodiments of the present invention will be described in more detail below by means of examples. One or more embodiments of the present invention are not limited by the following examples, and can also be carried out with appropriate modifications being made within the scope of the gist described above and below, and any of these modifications are included in the technical scope of one or more embodiments of the present invention.

Example 1-1

A total of 5 g of powders of $Li_2O$ (manufactured by Kojundo Chemical Lab., Co., Ltd., and having a purity of 99%, a specific surface area $S_w$ of 8.4 $m^2/g$, and a specific surface area diameter $d_{BET}$ of 355 nm), $La_2O_3$ (manufactured by Kojundo Chemical Lab., Co., Ltd., and having a purity of 99.9%, a specific surface area $S_w$ of 11.5 $m^2/g$, and a specific surface area diameter $d_{BET}$ of 80 nm), and $Ga_2O_3$ (manufactured by Kojundo Chemical Lab., Co., Ltd., and having a purity of 99.99%, a specific surface area $S_w$ of 10.4 $m^2/g$, and a specific surface area diameter $d_{BET}$ of 90 nm) was weighed in a glove box (with a dew point value of −98° C.) at a stoichiometric ratio such that a composition of a composite metal oxide that was generated was expressed as $Li_9La_3Ga_2O_{12}$. A mixture of these powders (raw material mixture) was molded through uniaxial pressing in a dry room (with a dew point value of −60° C.) under a pressure of 375 MPa, and the molded product was sintered in an air atmosphere at 1100° C. for 12 hours. Then, a pellet obtained by the sintering in the dry room was pulverized with a mortar for about 30 minutes, mixing was performed, and a sample obtained after the pulverization was set in a mold and molded through uniaxial pressing under a pressure of 375 MPa. Consequently, a pellet having a diameter of 10 mm and a thickness of about 1 mm was formed. The pellet was sintered at 1230° C. for 6 hours in a dry nitrogen atmosphere (at a flow rate of 2 L/min.) in which the dew point value was −60° C. Consequently, a sintered pellet was obtained.

Examples 1-2 to 1-10, Example 2-1, and Examples 3-1 to 3-3

Sintered pellets in these examples were obtained in the same manner as in Example 1-1, except for that the compositions of the respective composite metal oxides and the sintering times were set as indicated in Tables 1 and 2. In the examples in which Hf was contained, $HfO_2$ was used as an Hf source. In the examples in which Sr was contained, $SrCO_3$ was used as an Sr source. In the examples in which Zr was contained, $ZrO_2$ (with a BET specific surface area of 18.4 $m^2/g$) was used as a Zr source. The total amount of a raw material mixture in each of these examples was 5 g which was equal to that in Example 1-1.

Both surfaces of the sintered pellet obtained in each of the above examples were polished, and Au was sputtered on the said surfaces, whereby an electrode having a diameter of 8 mm was formed. The sintered pellet sample on which the electrode was formed set in an all-solid-state battery evaluation cell manufactured by Hohsen Corp., and was connected to a potentiostat/galvanostat, impedance measurement was performed within a temperature range from room temperature to 100° C., and an Li ion conductivity was evaluated. When the ion conductivity evaluated through the impedance measurement was classified into an ion conductivity based on contribution from bulk crystals and an ion conductivity based on contribution from grain boundaries, the value of $\sigma_{Bulk}$ (S/cm) corresponding to the bulk crystal site was also indicated together with a total conductivity $\sigma_{Total}$ (S/cm). Further, an activation energy $E_a$ (eV) was calculated from an Arrhenius plot obtained by using an ion conductivity value at each temperature. The results are indicated in Tables 1 and 2. The ion conductivity in Example 3-2 is a value at 75° C., the ion conductivity in Example 3-3 is a value at 50° C., and the ion conductivities in the other examples are each a value at 25° C.

The lattice constants indicated in Table 1 were measured according to the following procedure. Each sintered pellet was pulverized by using a mortar in a glove box and was subjected to crystal structure analysis by using an XRD (X-ray diffraction analysis) device manufactured by Bruker. A value of an inter-planar spacing d was obtained and a lattice constant was calculated, according to the following expression by using a (400)-plane peak among X-ray diffraction peaks having been obtained.

$$2d \sin \theta = n\lambda \tag{1}$$

$$1/d^2 = (h^2 + k^2 + l^2)/a^2 \tag{2}$$

d: inter-planar spacing, a: lattice constant

TABLE 1

| No. | Composition for preparation | Li mole ratio*1 | (Ga + V + Al) mole ratio*2 | $\sigma$Bulk (S/cm) | $\sigma$Total (S/cm) | $E_a$ (eV) (Total) | Lattice constant (Å) | Sintering time (h) |
|---|---|---|---|---|---|---|---|---|
| Example 1-1 | $Li_9La_3Ga_2O_{12}$ | 1.8 | 2/3 | — | $1.9 \times 10^{-5}$ | 0.38 | 12.96 | 6 |
| Example 1-2 | $Li_{8.6}Hf_{0.1}La_3Ga_2O_{12}$ | 1.72 | 2/3 | $3.7 \times 10^{-4}$ | $2.1 \times 10^{-5}$ | 0.42 | 12.97 | 6 |
| Example 1-3 | $Li_{9.1}La_{2.9}Sr_{0.1}Ga_2O_{12}$ | 1.82 | 2/3 | $1.6 \times 10^{-4}$ | $1.1 \times 10^{-6}$ | 0.41 | 12.95 | 6 |
| Example 1-4 | $Li_{8.9}La_3Zr_{0.1}Ga_{1.9}O_{12}$ | 1.78 | 1.9/3 | $2.7 \times 10^{-4}$ | $7.5 \times 10^{-5}$ | 0.4 | 12.95 | 6 |
| Example 1-5 | $Li_{8.7}Hf_{0.1}La_{2.9}Sr_{0.1}Ga_2O_{12}$ | 1.74 | 2/3 | $2.4 \times 10^{-4}$ | $1.5 \times 10^{-4}$ | 0.32 | 12.95 | 6 |
| Example 1-6 | $Li_9La_{2.9}Sr_{0.1}Zr_{0.1}Ga_{1.9}O_{12}$ | 1.8 | 1.9/3 | $4.0 \times 10^{-4}$ | $2.0 \times 10^{-4}$ | 0.34 | 12.95 | 6 |
| Example 1-7 | $Li_{8.5}Hf_{0.1}La_3Zr_{0.1}Ga_{1.9}O_{12}$ | 1.7 | 1.9/3 | $4.2 \times 10^{-4}$ | $1.7 \times 10^{-4}$ | 0.36 | 12.97 | 6 |
| Example 1-8 | $Li_{8.6}Hf_{0.1}La_{2.9}Sr_{0.1}Zr_{0.1}Ga_{1.9}O_{12}$ | 1.72 | 1.9/3 | — | $4.1 \times 10^{-4}$ | 0.3 | 13.09 | 20 |
| Example 1-9 | $Li_{8.85}Hf_{0.075}La_{2.9}Sr_{0.075}Zr_{0.075}Ga_{1.9}O_{12}$ | 8.85/4.95 | 1.9/2.975 | $6.8 \times 10^{-4}$ | $3.7 \times 10^{-4}$ | 0.28 | 13.06 | 20 |
| Example 1-10 | $Li_{9.1}Hf_{0.05}La_{2.9}Sr_{0.05}Zr_{0.05}Ga_{1.9}O_{12}$ | 9.1/4.9 | 1.9/2.95 | — | $1.3 \times 10^{-4}$ | 0.26 | 12.97 | 20 |

*1means a mole ratio of an amout of Li to a total amount of La, a metal element E, Ga, V, Al, and a metal element J.

*2means a mole ratio of a total amount of Ga, V and Al to a total amount of La and a metal element E.

TABLE 2

| No. | Composition for preparation | Li mole ratio*1 | (Ga + V + Al) mole ratio*2 | $\sigma$Bulk (S/cm) | $\sigma$Total (S/cm) | $E_a$ (eV) (Total) | Sintering time (h) |
|---|---|---|---|---|---|---|---|
| Example 2-1 | $Li_9La_3V_2O_{12}$ | 1.8 | 2/3 | — | $1.2 \times 10^{-5}$ | 0.4 | 6 |
| Example 3-1 | $Li_{8.6}Hf_{0.1}La_{2.9}Sr_{0.1}Zr_{0.1}Al_{1.9}O_{12}$ | 1.72 | 1.9/3 | — | $2.9 \times 10^{-6}$ | 0.36 | 6 |
| Example 3-2 | $Li_{8.6}Hf_{0.1}La_3Al_2O_{12}$ | 1.72 | 2/3 | — | $8.0 \times 10^{-7}$ at 75° C. | — | 6 |
| Example 3-3 | $Li_{9.1}La_{2.9}Sr_{0.1}Al_2O_{12}$ | 1.82 | 2/3 | — | $1.4 \times 10^{-7}$ at 50° C. | 0.43 | 6 |

*1means a mole ratio of an amout of Li to a total amount of La, a metal element E, Ga, V, Al, and a metal element J.

*2means a mole ratio of a total amount of Ga, V and Al to a total amount of La and a metal element E.

From Tables 1 and 2, it is found that each compound having a novel composition different from a conventional composition achieved favorable Li ion conduction.

Figure 1A:
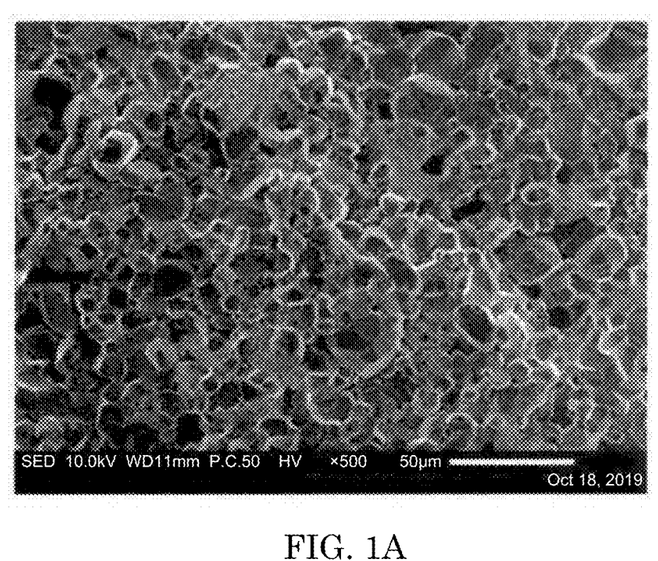
FIGS. 1A and 1B show substitutional photographs for drawings which show cross-sectional SEM observation images of sintered pellets obtained in Examples.
Figure 1B:
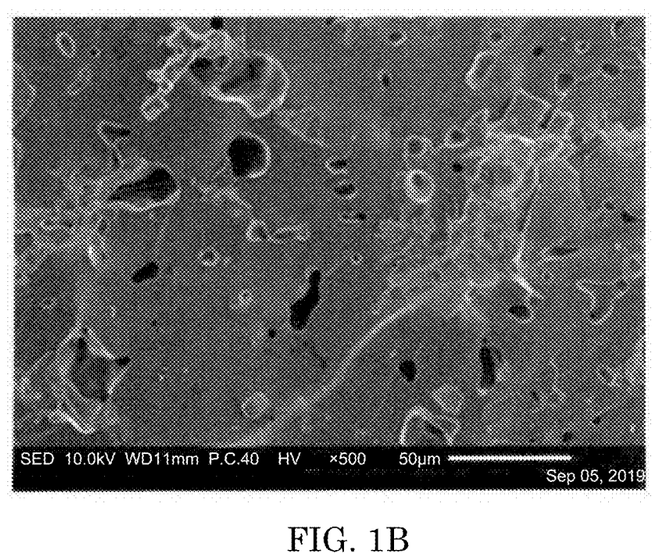

FIGS. 1A and 1B show cross-sectional SEM images of the sintered pellets obtained in Example 1-6 and Example 1-8. FIG. 1A corresponds to Example 1-6, and FIG. 1B corresponds to Example 1-8. FIGS. 1A and 1B show that each of Example 1-6 in which Zr was contained as well as Sr and Example 1-8 in which Hf and Zr were contained as well as Sr, had improved sinterability, and the number of areas where the interfaces between particles has disappeared increased, resulting in favorable Li ion conductivities.

Figure 2:
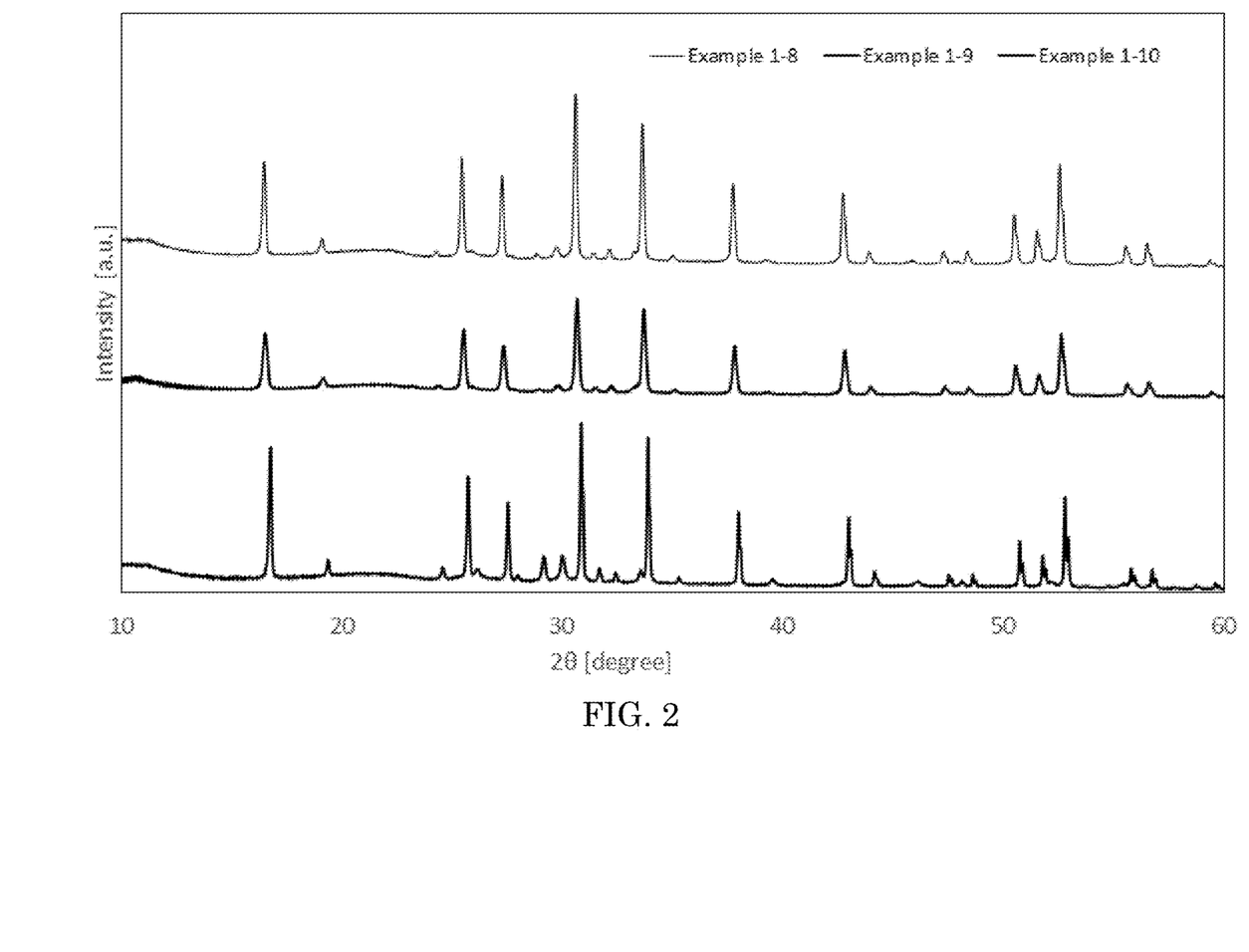
FIG. 2 shows XRD diffraction charts obtained by analyzing crystal structures of sintered pellets obtained in Examples.

FIG. 2 shows results of performing XRD analysis on the sintered pellets obtained in Examples 1-8 to 1-10. It has been found that the main phase in each of Examples 1-8 to 1-10 is a garnet structure.

What is claimed is:

1. An Li ion conductor comprising:
   at least one selected from the group Q consisting of Ga, V, and Al;
   Li;
   La; and
   O,
   wherein:
   a part of an Li site is optionally substituted with a metal element D,
   a part of an La site is optionally substituted with a metal element E,
   parts of Ga, V and Al sites are optionally substituted with a metal element J,
   a mole ratio of an amount of Li to a total amount of La, the element E, Ga, V, Al, and the element J is not lower than 8.1/5 and not higher than 9.5/5, and
   a mole ratio of a total amount of Ga, V, and Al to a total amount of La and the element E is not lower than 1.1/3 and not higher than 2/3.

2. The Li ion conductor according to claim 1, wherein a lattice constant of the Li ion conductor is not smaller than 12.95 Å.

3. The Li ion conductor according to claim 2, wherein:
   the Li ion conductor is represented by formula (1) which is $(Li_{p1}D_{p2})(La_{p3}E_{p4})(Q_{p5}J_{p6})O_{12}$, and
   in the formula (1),
   Q is at least one element selected from the group consisting of Ga, V, and Al,
   D is a metal element with which a part of the Li site is substituted,
   E is a metal element with which a part of the La site is substituted,
   J is a metal element with which a part of the Q site is substituted,
   p1, p3, and p5 are values larger than 0,
   p2, p4, and p6 are optionally 0,
   p1/(p3+p4+p5+p6) is not lower than 8.1/5 and not higher than 9.5/5,
   p5/(p3+p4) is not lower than 1.1/3 and not higher than 2/3, and
   (a valence of Li)×p1+(a valence of the element D)×p2+(a valence of La)×p3+(a valence of the element E)×p4+(a valence of the element Q)×p5+(a valence of the metal element J)×p6=24 is satisfied.

4. The Li ion conductor according to claim 3, wherein:
   p1 is not smaller than 8.1 and not larger than 9.5,
   each of p2, p4, and p6 is not smaller than 0 and not larger than 0.5,
   p3 is not smaller than 2.5 and not larger than 3, and
   p5 is not smaller than 1.5 and not larger than 2.

5. The Li ion conductor according to claim 1, wherein:
   the Li ion conductor is represented by formula (1) which is $(Li_{p1}D_{p2})(La_{p3}E_{p4})(Q_{p5}J_{p6})O_{12}$, and
   in the formula (1),
   Q is at least one element selected from the group consisting of Ga, V, and Al,
   D is a metal element with which a part of the Li site is substituted,
   E is a metal element with which a part of the La site is substituted,
   J is a metal element with which a part of a Q site is substituted,
   p1, p3, and p5 are values larger than 0,
   p2, p4, and p6 are optionally 0,
   p1/(p3+p4+p5+p6) is not lower than 8.1/5 and not higher than 9.5/5,
   p5/(p3+p4) is not lower than 1.1/3 and not higher than 2/3, and
   (a valence of Li)×p1+(a valence of the element D)×p2+(a valence of La)×p3+(a valence of the element E)×p4+(a valence of the element Q)×p5+(a valence of the metal element J)×p6=24 is satisfied.

6. The Li ion conductor according to claim 5, wherein:
   p1 is not smaller than 8.1 and not larger than 9.5,
   each of p2, p4, and p6 is not smaller than 0 and not larger than 0.5,
   p3 is not smaller than 2.5 and not larger than 3, and
   p5 is not smaller than 1.5 and not larger than 2.

7. An Li ion conductor represented by formula (2) which is $Li_{x1}La_{x2}(Ga, V, Al)_{x3}Hf_{x4}Sr_{x5}Zr_{x6}O_{12}$, wherein, in the formula (2):
   x1 is not smaller than 8.1 and not larger than 9.5,
   x2 is not smaller than 2.5 and not larger than 3,
   x3 is not smaller than 1.5 and not larger than 2,
   each of x4, x5, and x6 is independently not smaller than 0 and not larger than 0.5,
   $x1+x2\times3+x3\times3+x4\times4+x5\times2+x6\times4=24$ is satisfied,
   (Ga, V, Al) means that at least one of Ga, V, and Al is contained, and,
   when a plurality of elements among Ga, V, and Al are contained, x3 represents a total amount of the plurality of elements.

8. A process for producing an Li ion conductor, the process comprising sintering a raw material mixture at not lower than 1100° C., wherein:
   the raw material mixture contains at least one selected from the group Q consisting of Ga, V, and Al, Li, and La,
   the raw material mixture further contains at least one of a metal element D with which a part of an Li site in a crystal structure can be substituted, a metal element E with which a part of an La site in the crystal structure can be substituted, and a metal element J with which parts of Ga, V and Al sites in the crystal structure can be substituted, and
   in the raw material mixture, a mole ratio of an amount of Li to a total amount of La, the element E, Ga, V, Al, and the element J is not lower than 8.1/5 and not higher than 9.5/5, and a mole ratio of a total amount of Ga, V, and Al to a total amount of La and the element E is not lower than 1.1/3 and not higher than 2/3.

9. The process according to claim 8, wherein:
   a mole ratio among the metal elements in the raw material mixture is a stoichiometric ratio in a compound represented by formula (1) which is $(Li_{p1}D_{p2})(La_{p3}E_{p4})(Q_{p5}J_{p6})O_{12}$, and in the formula (1),
- Q is at least one element selected from the group consisting of Ga, V, and Al,
- D is a metal element with which a part of the Li site is substituted,
- E is a metal element with which a part of the La site is substituted,
- J is a metal element with which a part of a Q site is substituted,
- p1, p3, and p5 are values larger than 0,
- p2, p4, and p6 are optionally 0,
- p1/(p3+p4+p5+p6) is not lower than 8.1/5 and not higher than 9.5/5,
- p5/(p3+p4) is not lower than 1.1/3 and not higher than 2/3, and
- (a valence of Li)×p1+(a valence of the element D)×p2+(a valence of La)×p3+(a valence of the element E)×p4+(a valence of the element Q)×p5+(a valence of the metal element J)×p6=24 is satisfied.

* * * * *